United States Patent [19]

Nakamura et al.

[11] Patent Number: 4,617,485
[45] Date of Patent: Oct. 14, 1986

[54] ROTOR OF ALTERNATOR MOUNTED ON VEHICLE

[75] Inventors: Shigenobu Nakamura, Chiryu; Takayasu Nimura, Nagoya; Toshiaki Hotta, Oobu, all of Japan

[73] Assignee: Nippondenso Co., Ltd., Kariya, Japan

[21] Appl. No.: 682,851

[22] Filed: Dec. 18, 1984

[30] Foreign Application Priority Data

Dec. 19, 1983 [JP] Japan .............................. 58-237871
Jan. 6, 1984 [JP] Japan .................................. 59-946

[51] Int. Cl.⁴ .......................................... H02K 1/32
[52] U.S. Cl. ...................................... 310/65; 310/59; 310/214; 310/263
[58] Field of Search ................ 310/263, 52, 257, 51, 310/62, 63, 43, 45, 156, 214, 61, 58, 59, 85, 86; 417/423 R, 368; 415/143

[56] References Cited

U.S. PATENT DOCUMENTS

| | | | |
|---|---|---|---|
| 3,184,625 | 5/1965 | Farison | 310/263 |
| 3,230,404 | 1/1966 | Graham | 310/51 |
| 3,253,167 | 5/1966 | Bates | 310/263 |
| 3,271,606 | 9/1966 | Collins | 310/263 |
| 3,445,694 | 5/1969 | Campbell | 310/263 |
| 3,617,782 | 11/1971 | Nakamura | 310/263 |
| 3,873,243 | 3/1975 | Nusser et al. | 310/62 |
| 4,421,998 | 12/1983 | Ahner | 310/263 |

FOREIGN PATENT DOCUMENTS 79455 5/1983 Japan .................................. 310/263

Primary Examiner—R. Skudy
Attorney, Agent, or Firm—Cushman, Darby & Cushman

[57] ABSTRACT

An improved construction of Randel-type rotor of a vehicle-mounted alternator, capable of reducing the windage noise which is produced as a result of interference between the rotor and the stator of the alternator. The rotor has a pair of pole cores provided with a plurality of mutually meshing claws, and an exciting coil disposed at the inner side of the pole cores. Spacers in the form of an integral ring or discrete wedges are fitted in the spaces between adjacent pole core claws so as to provide a substantially smooth cylindrical outer peripheral surface of the rotor portion facing the radial teeth on the stator.

7 Claims, 16 Drawing Figures

ROTOR OF ALTERNATOR MOUNTED ON VEHICLE

BACKGROUND OF THE INVENTION

1. Field of the Invention

The present invention relates to a rotor of an alternator for use on vehicles and, more particularly, to an alternator rotor provided with a Randel-type pole core having a plurality of meshing claws.

2. Description of the Prior Art

Japanese Patent Laid-Open No. 79455/1983 discloses an example of the construction of rotor of a vehicle mounted alternator, improved to provide a greater cooling effect. In this alternator rotor, a pair of rotor cores, each having pole cores in the form of a plurality of axially projecting claws, are fixed to the rotor shaft such that exciting coils fixed to a yoke are clamped between the pair of rotor cores. The pole core arrangement in which the pole cores of a pair of rotor cores oppose and mesh each other is generally referred to as "Randel-type Pole Core". The invention disclosed in the above-mentioned Japanese patent Laid-Open No. 79455/1983 is intended for reducing the air flow resistance to increase the flow rate of the cooling air, and the alternator disclosed therein meets this requirement.

SUMMARY OF THE INVENTION

It is a current trend to reduce the size and weight while increasing the power of vehicle-mounted alternators. To this end, it is attempted to drive the alternator at higher speeds than ever, by increasing the pulley ratio. This in turn causes, however, an increase in the windage noise generated in the alternator. Namely, when the rotor having the Randel-type pole cores rotates at a high speed, the side surfaces of the pole core claws cause centrifugal windage effect in the areas between the pole core claws so that a pulsating air pressure is produced in the area between the stator and the pole cores. This pulsating pressure interferes with the concavities and convexities in the teeth portion on the inner periphery of the stator, thus producing the above-mentioned windage noise.

Accordingly, it is a primary object of the invention to provide a rotor for vehicle-mounted alternator, improved to eliminate the windage noise caused by the aerodynamic interference between the pole cores and the stator, without impairing the flow of the cooling air within the rotor.

To this end, the invention provides, in a vehicle-mounted alternator having a rotor constituted by a pair of pole cores having alternately meshing claws and exciting coils wound on the inner side of the pole cores, and a stator having teeth radially opposing the rotor, an improvement of the rotor which comprises: spacers, for example, an integral ring made of a non-magnetic material or separate wedges constituted by resin pipes, fitting in the spaces formed between adjacent claws of pole core such that at least the portion of the rotor opposing to said teeth exhibits a smooth cylindrical outer peripheral surface.

BRIEF DESCRIPTION OF THE DRAWINGS

FIGS. 12 to 15 are vertical sectional views of essential parts of another embodiment of the invention;

DESCRIPTION OF THE PREFERRED EMBODIMENT

Figure 1:
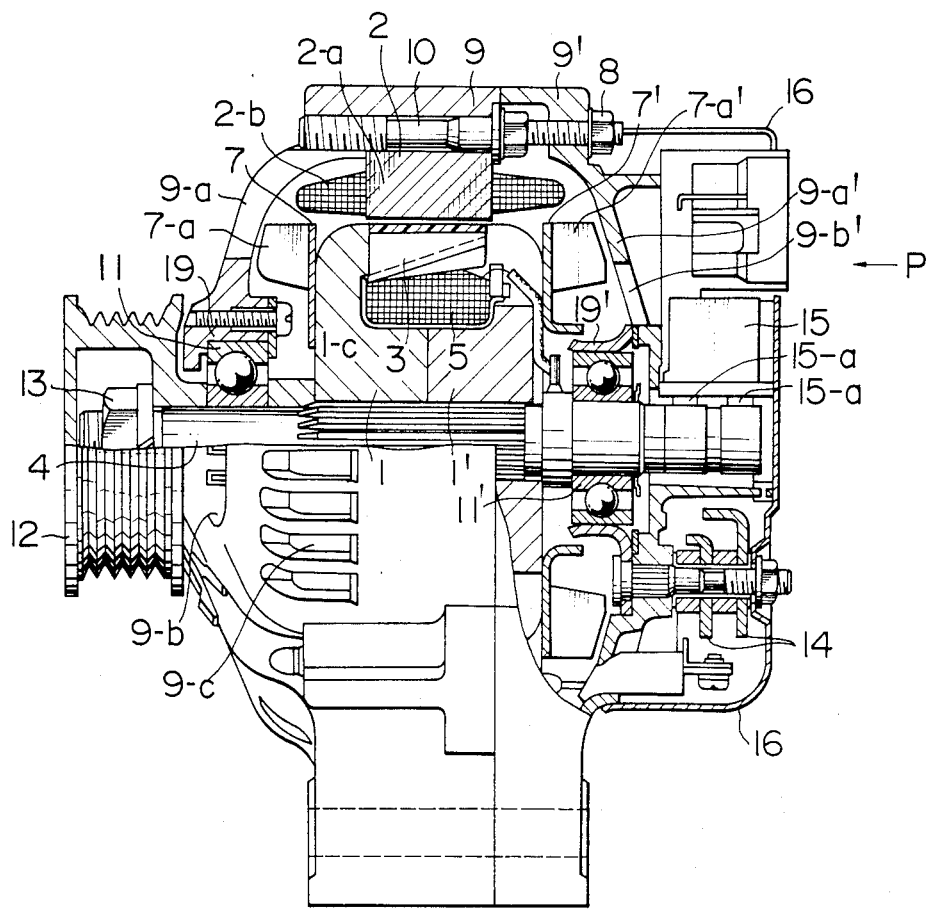
FIG. 1 is a schematic illustration of the whole construction of an alternator to which the invention is applied.
Figure 2:
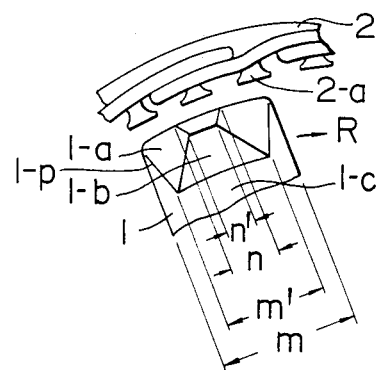
FIG. 2 is a schematic illustration showing a part of the arrangement of the stator and the rotor of the alternator shown in FIG. 1.

Preferred embodiments of the invention will be described hereinunder with reference to the accompanying drawings. FIG. 1 is an illustration of the construction of an alternator to which the invention is applied, while FIG. 2 shows a portion of the alternator to illustrate the arrangement of the stator and pole core in the alternator. The alternator has a shell constituted by a pair of frames 9,9' each having a bowl-like form. The frames 9,9' are jointed together at their open end surfaces and are fixed to each other by a plurality of stud bolts 10 and cooperating nuts 8 (only one stud bolt and one nut are shown). A stator 2 is fixed to the inner peripheral surface of the frame 9 by means of said stud bolts 10. The stator 2 is composed of a stator core 2-a and a stator coil 2-b wound on the stator core 2-a. As well known to those skilled in the art, the stator core 2-a has a plurality of pole teeth (referred to simply as "pole teeth", hereinunder) on the inner peripheral surface thereof. Tubular bearing boxes 19,19' are formed on the central portions of side surfaces of both frames 9,9' so as to project therefrom inwardly of the alternator. These bearing boxes 19,19' hold bearings 11,11' which carry a shaft 4 rotatably. A pair of claw-type pole cores 1,1' are mechanically fixed to the shaft 4 so as to be housed by the stator. The pole cores 1,1' clamp therebetween a rotor coil 5 which is known per se. Centrifugal fans 7,7' having a diameter smaller than the inside diameter of the stator are fixed by suitable means to the outer sides of the pole cores 1,1' such that the vanes 7-a,7-a' of the fans 7,7' project axially away from the pole cores 1,1'. The fan 7 is of the slant-flow type having vanes 7-a inclined forwardly as viewed in the direction of rotation so that it forcibly supplies the cooling air into the pole cores 1,1'.

On the opposing surfaces of the pair of end frames 9,9' are formed shrouds 9-a,9-a' opposing the vanes 7-a,7-a' of the fans 7,7' across a small gap so as to serve as guide vanes for the fans 7,7'. Suction windows 9-b,9-b' are formed in the portions of the both end frames 9,9' adjacent to the bearings 11,11' on the both end frames 9,9' so that cooling air is induced by the fans 7,7' through these suction windows 9-b,9-b'. Discharge windows 9-c,9-c' for outgoing heated air are formed in the portions of the end frames 9,9' confronting the outer periphery of the stator coil 2-b. (The discharge window 9-c' is omitted from the drawings.)

A pulley 12 disposed outside the end frame is coupled by a nut 13 to the end of the shaft 4 projected to the outside of the bearing 11. The pulley 12 and, hence, the shaft 4 is adapted to be driven by an engine (not shown). Electric parts such as a diode fin 14 having a diode (not shown), a brush holder 15 having brushes 15-a for supplying the rotor coil with exciting current, and an IC regulator (not shown) for regulating the output voltage are fixed to the outer side of the frame 9' and is covered by a rear cover 16. The rear cover 16 is formed in such a manner as to surround the diode fin 14, brush holder 15 and the regulator, and is provided in its side wall with holes through which cooling air is supplied to cool the regulator and the diode fin. In FIG. 2, a symbol R represents the direction of rotation of the rotor.

An explanation will be made hereinunder as to an embodiment of the alternator rotor of the invention. Referring to FIG. 2, in order to avoid any leakage of magnetic flux between the pole claws and to ensure an effective application of the magnetic flux to the stator 2, the claws 1-p,1-p' of the pole cores 1,1' of the rotor have inside widths m',n' smaller than the outside widths m,n both at the base and extreme ends thereof.

Figure 3:
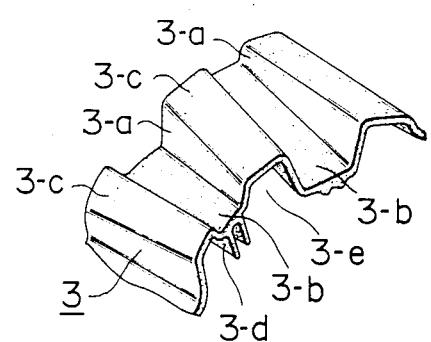
FIG. 3 is a perspective view of a ring member mounted between the pole cores of a first embodiment in accordance with the invention.
Figure 4:
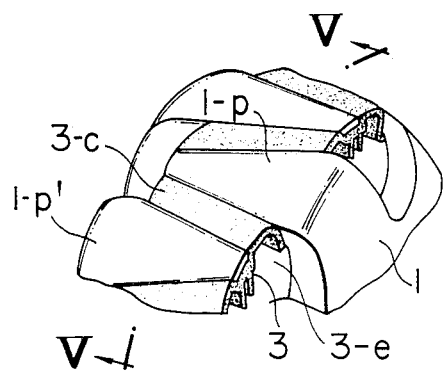
FIG. 4 is a perspective view of a rotor on which the ring member shown in FIG. 3 is mounted.
Figure 5:
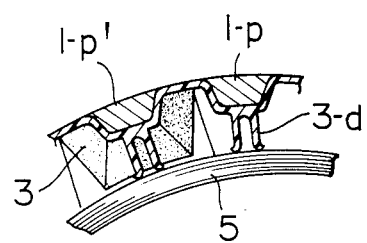
FIG. 5 is a sectional view taken along the line V—V of FIG. 4.
Figure 6:
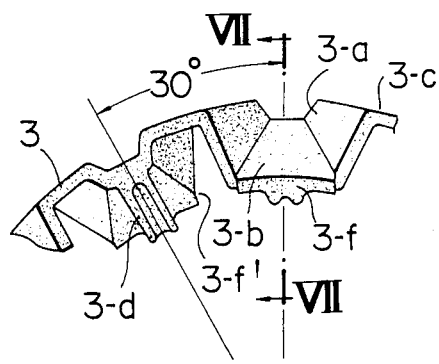
FIG. 6 is a side elevational view of a portion of the ring member used in the first embodiment.
Figure 7:
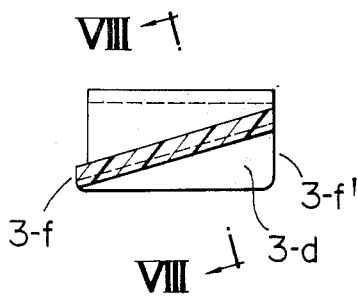
FIG. 7 is a sectional view taken along the line VII—VII of FIG. 6.
Figure 8:
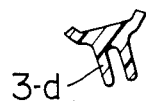
FIG. 8 is a sectional view taken along the line VIII—VIII of FIG. 7.
Figure 9:
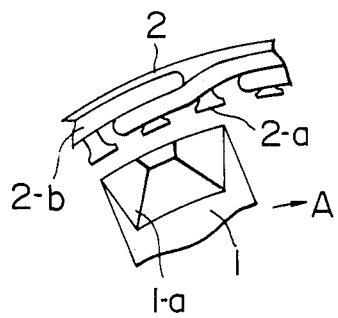
FIG. 9 is an illustration of a portion of an alternator, showing the arrangement of the stator and the core thereof in accordance with a second embodiment of the invention.

In the rotor in accordance with the invention, a plastic ring or spacer 3 is mounted to fill the gaps between adjacent claws 1-p,1-p' of the pole cores 1,1' and the gaps between back surfaces 1-b of the claws (see FIG. 2) and the rotor coil 5, in a manner as shown in FIGS. 4 and 5. The plastic ring 3 has a configuration as shown in FIGS. 3 and 6. Namely, the plastic ring 3 has a continuous ring-like form constituted by a claw-back plate 3-b and claw-side plates 3-a which are shaped to embrace the back surface 1-b and both side surfaces 1-a of each claw 1-p, and curved outer peripheral plate 3-c which fills the outer peripheral space between opposing claws 1-p,1-p'. Ribs 3-d are extended radially inwardly from the claw-back plate 3-b towards the center of the rotor coil 5. As will be seen from FIG. 6, ribs 3-d are disposed at 30° interval. The plastic ring 3 is fixed axially between the side surfaces 1-c,1-c' (side surface 1-c' not shown) of base ends of the pair of pole cores 1,1' and the end surfaces 3-f,3-f' of the claw-back plates 3-b, while the ribs 3-d are fixed to the radially outer end of the rotor coil 5 and the back surface 1-b of the pole core mechanically in such a manner as to leave a certain tightening margin. The axial width of the resin ring 3 should be, at the smallest, such that the convexities and concavities in the outer periphery of the pole core claws 1-p,1-p' opposing the teeth 2-a of the stator 2 are eliminated when the ring 3 is mounted between the pole cores 1,1'. Ring or spacer 3 also prevents flow of air radially between the claws 1-p, 1-p'. The plastic ring or spacer 3 is so shaped as to form spaces 3-e between the inner sides and the outer peripheral plates 3-c and the rotor coil 5 that is axially of the rotor. The air induced by the centrifugal fans 7-a,7-a' flows through these spaces 3-e i.e. axial of the rotor.

Figure 10:
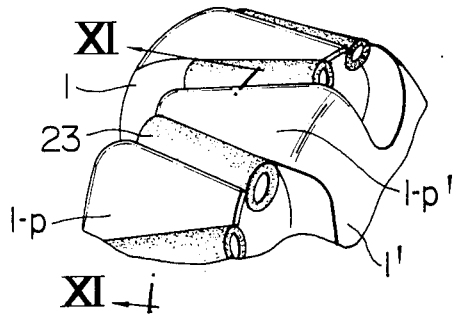
FIG. 10 is a perspective view of an essential part of an alternator rotor to which the second embodiment of the invention is applied.
Figure 11:
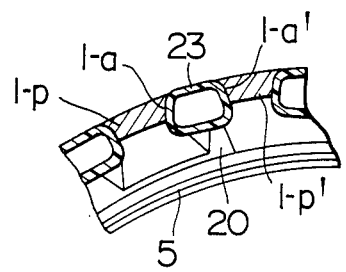
FIG. 11 is a vertical sectional schematic illustration of an essential part taken along the line XI—XI of FIG. 10.

Another embodiment of the invention will be described hereinunder. FIG. 10 is a perspective view of an essential part of another embodiment of the alternator rotor in accordance with the invention, while FIG. 11 is a schematic vertical sectional view taken along the line XI—XI of FIG. 10. As will be seen from these Figures, this embodiment employs pipe-shaped pole core wedges 23 press-fitted in the spaces formed between the opposing side surfaces 1-a,1-a' of adjacent claws 1-p,1-p' of the pole cores 1,1'. Each pole core wedge 23 has an axial length which is, at the smallest, large enough to eliminate any convexities and concavities on the portion of the outer periphery of the pole core claws confronting the stator teeth 2-a. The pole wedge cores thus mechanically fitted in the gaps between the side surfaces of the claws are subjected to an impregnation treatment for enhancing the insulating power. This impregnation treatment enhances also the strength of fixing of the pole core wedges 23.

Figure 12:
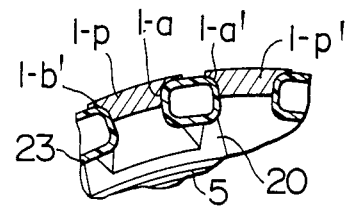

In order to further improve the resistance of the pole core wedges against the centrifugal force, flanges 1-b' as shown in FIG. 12 may be formed on the circumferential ends of each pole core claw.

Figure 13:
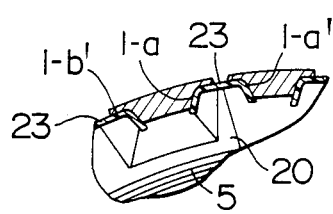

The pole core wedge 23 can have a substantially U-shaped form as shown in FIG. 13. This pole core wedge may be used in combination with the pole core having the flanges 1-b'.

Figure 14A:
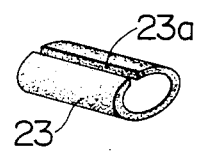
FIG. 14A is a perspective view of a pole core wedge.
Figure 14B:
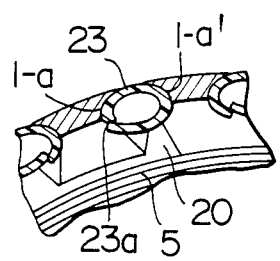
FIG. 14B is a vertical sectional schematic illustration of an essential part having the pole core wedges attached thereto.

The pole core wedge need not have a continuous peripheral surface. Namely, it can have a tubular form provided with an axially-extending key-way 23a formed therein, as shown in FIGS. 14A and 14B so that it can be compressed and driven into the gap easily.

Although in the described embodiment the pole core wedge 23 is made from a resin, the pole core wedge can be made from other materials. For instance, it can be made from a non-magnetic metal such as aluminum, stainless steel or the like, by die-casting, press or cold forging. The pole core wedge need not always be hollow but may be solid.

Figure 15:
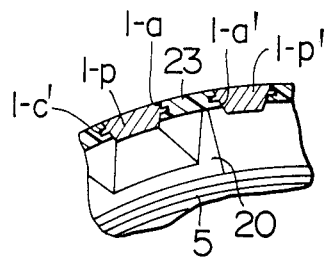

FIG. 15 shows a modification in which the pole core wedge 23 is provided in its side walls with slots which receive collars 1-c' projected circumferentially from both side surfaces of the pole core claw.

The operation of the vehicle-mounted alternator itself is well known and, therefore, will be explained only briefly. Exciting current is supplied to the rotor coil 5 through brushes 15-a and slip ring. At the same time, the pulley 12 is driven by the engine to rotate the rotor coil 5, so that an alternating voltage E is induced in the stator coil 2-b. The output voltage is rectified by a rectifier and is regulated by the regulator, as is well known.

The alternator rotor of the invention produces the following effect.

When the shaft 5 rotates, the cooling fans 7-a, 7-a' on both sides of the pole cores 1,1' are rotated to induce ambient air of low temperature through the suction windows 9-b,9-b'. The air first cools the bearings 11,11' and then cools the stator coil 2-b. The heated air is discharged through the discharge window 9-c. A part of the cooling air is forced to flow towards the pole cores 1,1' so as to absorb heat from the rotor coil 5 and to cool the stator coil 2-b before it leaves the alternator through the discharge window 9-c.

When a part of the cooling air passes the area around the pole cores 1,1', particularly in the current high-speed alternator, the side surfaces 1-a of the pole core claws 1-p act as fan blades to produce centrigugal flow of air to cause a pulsation of air pressure in the area between the stator 2 and the pole cores 1,1', thus generating unfavourable windage noise due to interference between the opposing convexities and concavities of the stator teeth 2-a and the slots. This problem, however, can be overcome by the invention. Namely, in the alternator having the rotor in accordance with the invention, the spaces between the side surfaces of adjacent pole core claws are filled by the plastic ring 3 which provides a smooth cylindrical outer peripheral surface of the pole core claws 1-p,1-p' having no substantial convexities and concavities, so that the side surfaces 1-a of the pole core claws does not produce centrifugal fan effect, so that the generation of the windage noise due to the centrifuged air and the convexities and concavities presented by the stator teeth 2-a is avoided.

In addition, the claw-back plates 3-b of the plastic ring 3 covers the back surfaces 1-b of the pole cores to provide a surficient insulation between the outer peripheral surface of the pole core and the inner peripheral surface of the pole core claws 1, so that the rotor coil 5 can be formed at a sufficiently large space factor. The plastic ring 3 can be stably and securely held because it is fitted with tightening margin between two pole cores 1,1' and between the back surface 1-b of the pole claws and the rotor coil 5. In addition, since the claw-back plates 3-b abutting the back surfaces 1-b of the pole core claws are formed integrally with the curved outer peripheral plates 3-c, the undesirably breaking and separation of the curved outer peripheral plates 3-c due to centrifugal force is avoided advantageously.

Since spaces 3-e are formed at the inner side of the outer peripheral plates 3-c of the ring 3, the cooling air induced by the cooling fans 7 during rotation of the rotor coil 5 is allowed to flow axially as in the case of the conventional alternator rotor despite the presence of the plastic ring 3, so that the rotor coil 5 can be cooled sufficiently.

In the conventional alternator rotor, a part of the cooling air is forced to flow towards the stator 2 by the centrifugal fan effect produced by the claws 1-p,1-p' so as to impair the effect of cooling of the rotor coil 5. In contrast, in the stator rotor of the invention, the whole part of the air can flow through the passage between the pole core claws 1-p,1-p' so that the rotor coil 5 can be cooled effectively.

Although in the described embodiment the ring 3 is made of a plastic, this is not exclusive and the ring 3 may be shaped from a non-magnetic material such as aluminum, stainless steel or the like by a press, cold forging or the like, followed by a coating with an electrically insulating paint.

In the illustrated embodiments, the ribs 3-d for pressing the pole core claws 1-p,1-p' has a split form consisting of two radially inward projections. The rib 3-d, however, can be composed of a single projection or three or more projections. The ring 3 itself may be composed of a plurality of separate segments, although in the described embodiment it is an integral member.

In the second embodiment of the invention, the pole core wedges 23 fitted in the spaces between the pole core claws provide substantially smooth cylindrical outer peripheral surface of the rotor portion opposing to the teeth 2-a of the stator, as in the case of the first embodiment. Therefore, the side surfaces of the pole core claws 1-a do not produce any centrifugal fan effect so that the generation of unfavourable windage noise is avoided even in the high-speed operation of the alternator. Since the axial spaces or passages are left between the pole core wedges 23 and the outer peripheral surface of the coil 5, the air can flow axially as in the case of the conventional alternator core, so that the cooling of the coil 5 is never impaired. Rather, the cooling effect is enhanced because the provision of the pole core wedges 23 ensures the passage of the whole part of the cooling air through the gaps between the pole core claws, unlike the conventional alternator core in which a part of the air is scattered towards the stator to impair the effect of cooling of the rotor coil 5.

As has been described, according to the invention, the rotor of the invention for vehicle-mounted alternator has a non-magnetic ring or pole core wedges fitted in the gaps between the adjacent claws of the pole cores in such a manner as to provide a substantially smooth cylindrical outer peripheral surface of the rotor portion facing the teeth on the stator. Therefore, the unfavourable windage noise, which is inevitable in the conventional alternator due to interference between the pole core and the stator teeth, is avoided to reduce the level of noise during high speed rotation of the rotor. In addition, since the ring and the pole core wedges are constructed to allow the air from the cooling fans to flow into the spaces between the pole cores, the heat generated by the rotor coil in the rotor can be effectively carried away by the cooling air.

What is claimed is:

1. In a vehicle-mounted alternator having a rotor including a pair of Randel-type pole cores having mutually meshing claws and an exciting coil provided at the inner side of said pole cores, and a stator having teeth extending radially inwardly to oppose said rotor, an improved rotor construction comprising: spacers made of a non-magnetic material and disposed between adjacent pole core claws of said pole cores in such a manner as to provide, together with said claws, a substantially smooth cylindrical outer peripheral surface for a portion of said rotor facing said teeth of said stator which prevents the flow of air radially between said claws of said portion and also provide a space constituting a passage for cooling air axially between the inner sides of said spacers and the outer peripheral surface of said exciting coil.

2. A rotor construction according to claim 1, wherein outer peripheries of gaps between the meshing claws are smaller than inner peripheries and said spacers comprise wedges press-fitted into said gaps.

3. A rotor construction according to claim 1, wherein said spacers are constituted by hollow tubular members.

4. A rotor construction according to claim 1, wherein flanges for retaining said spacers are formed on the circumferential ends of the outer peripheral surface of each of said pole core claws.

5. A rotor construction according to claim 1, wherein a plurality of said spacers are formed integrally to form of a ring having convexities and concavities in its outer peripheral surface.

6. A rotor construction according to claim 5, wherein said ring is contacted by side surfaces and inner peripheral surfaces of said claws of said pole cores.

7. A rotor construction according to claim 6, wherein said ring is shaped integrally from a plastic and is held with a tightening margin between inner peripheral surfaces of said claws and the outer peripheral surface of said exciting coil.

* * * * *